United States Patent [19]

Murakami et al.

[11] Patent Number: 4,786,559
[45] Date of Patent: * Nov. 22, 1988

[54] MAGNETOOPTICAL STORAGE ELEMENT

[75] Inventors: Yoshiteru Murakami, Nishinomiya; Akira Takahashi, Nara; Hiroyuki Katayama, Ikoma; Tomoyuki Miyake, Tenri; Kenji Ohta, Nara; Michinobu Mieda, Tenri, all of Japan

[73] Assignee: Sharp Kabushiki Kaisha, Osaka, Japan

[*] Notice: The portion of the term of this patent subsequent to Jan. 5, 2005 has been disclaimed.

[21] Appl. No.: 945,354

[22] Filed: Dec. 22, 1986

[30] Foreign Application Priority Data

Dec. 25, 1985 [JP] Japan .................................. 60-296076
Apr. 1, 1986 [JP] Japan .................................... 61-76342

[51] Int. Cl.$^4$ ................................................. G11B 7/24
[52] U.S. Cl. ........................................ 428/472; 428/694; 428/698; 428/900
[58] Field of Search ............... 428/694, 972, 900, 698; 365/122; 360/131, 135; 369/13, 288, 375, 376

[56] References Cited

U.S. PATENT DOCUMENTS 4,230,939 10/1980 de Bont et al. ...................... 430/495
4,610,903 9/1986 Nomura et al. ...................... 428/694
4,717,628 1/1988 Takahashi et al. ................... 428/694

FOREIGN PATENT DOCUMENTS 111988 6/1984 European Pat. Off. .
192256 8/1986 European Pat. Off. .
195532 9/1986 European Pat. Off. .
34133 2/1985 Japan .
92455 5/1986 Japan .
115252 7/1986 Japan .

Primary Examiner—George F. Lesmes
Assistant Examiner—William Atkinson
Attorney, Agent, or Firm—Ciotti & Murashige, Irell & Manella

[57] ABSTRACT

A magnetooptical storage element comprising a recording layer of a multi-layered structure including a reflecting film, said reflecting film being made of metals or metalloids having a low thermal conductivity coefficient.

4 Claims, 1 Drawing Sheet

MAGNETOOPTICAL STORAGE ELEMENT

BACKGROUND OF THE INVENTION

1. Field of the Invention

This invention relates to a magnetooptical storage element in which recording, reproduction, erasure, etc., of information are carried out by irradiating laser beams, etc., thereto.

2. Description of the Prior Art

In recent years, magnetooptical storage elements have been greatly developed as optical memory elements attaining recording, reproduction and erasure of information. Particularly, a magnetooptical storage element in which a thin film made of an amorphous alloy containing rare-earth transition metals is used as a storage medium is advantageous in that a recorded bit is not affected by the grain boundary and the film of the magnetooptical storage element can be easily manufactured to have a large surface area. However, the above-mentioned magnetooptical storage element, in which the thin film made of an amorphous alloy containing rare-earth transition metals is used as the storage medium, cannot generally achieve photomagnetic effects (i.e., Kerr effect and Faraday effect) to a full extent, resulting in an insufficient signal-to-noise ratio (i.e., S/N) of reproduced signals.

In order to eliminate such problem, an element structure referrred to as "a reflecting-film structure" has been applied to the magnetooptical storage element as described in, for example, Japanese Patent Laid-Open Publication No. 12428/1982. FIG. 2 shows a conventional magnetooptical storage element having the reflecting-film structure which comprises a transparent substrate 101 made of glass, polycarbonate, an epoxy resin, etc., a transparent dielectric film 102 having a refractive index higher than that of the transparent substrate 101, a thin film 103 made of an amorphous alloy containing rare-earth transition metals, a transparent dielectric film 104, and a reflecting metal film 105. In this conventional magnetooptical storage element having the above-mentioned structure, the thickness of the thin film 103 is so small that when laser beams are incident upon the thin film 103, a portion of the laser beam passes through the thin film 103. Therefore, both the Kerr effect, which is achieved by reflection of the laser beams on the surface of the thin film 103, and the Faraday effect, which is achieved by transmission of the laser beams through the thin film 103 upon reflection of the laser beams on the reflecting metal film 105 after the laser beams have passed through the thin film 103, are exercised on the reproduced light, so that a Kerr rotational angle of the reproduced light superficially increases as large as several times that of a magnetooptical storage element subjected to only the Kerr effect. For example, when the magnetooptical storage element shown in FIG. 2 was composed of the transparent substrate 101 made of glass, the transparent dielectric film 102 made of AlN, the thin film 103 made of GdTbFe, the transparent dielectric film 104 made of AlN, and the reflecting metal film 105 made of Al, the Kerr rotational angle increased to 1.6° superficially.

However, when the reflecting metal film 105 is made of Al as mentioned above, the coefficient of thermal conductivity of Al is so high that when laser beams are irradiated onto the thin film 103 from the transparent substrate 101 so as to attain the recording of information, heat absorption arises in the said reflecting film 105 to a great extent, making necessary increased laser power for the recording of information (i.e., resulting in a magnetooptical storage element having a low recording sensitivity).

SUMMARY OF THE INVENTION

The magnetooptical storage element of this invention, which overcomes the above-discussed and numerous other disadvantages and deficiencies of the prior art, comprises a recording layer of a multi-layered structure including a reflecting film, said reflecting film being made of metals or metalloids having a low thermal conductivity coefficient.

In a preferred embodiment, the metals or metalloids are one selected from the group consisting of tantalum, titanium, lead, zirconium, bismuth, tellurium, and selenium.

In a preferred embodiment, the recording layer comprises a transparent substrate, a first transparent dielectric film on said substrate, a thin film of an amorphous alloy containing rare-earth transition metals on said first transparent dielectric film, a second transparent dielectric film on said thin film, and a reflecting film on said second transparent dielectric film.

In a preferred embodiment, the transparent substrate is made of one selected from the group consisting of glass, polycarbonate, an acrylic resin, and an epoxy resin.

In a preferred embodiment, the first and/or second transparent dielectric films are made of one selected from the group consisting of AlN, SiN, ZnN, SiO, and $SiO_2$.

In a preferred embodiment, the thin film is made of an amorphous alloy of one selected from the group consisting of GdTbFe, GdTbFeCo, TbFe, and TbFeCo.

Thus, the invention described herein makes possible the objects of (1) providing a magnetooptical storage element which has an excellent recording sensitivity; (2) providing a magnetooptical storage element which has an excellent recording-reproductivity of information; and (3) providing a magnetooptical storage element which has an excellent reliability over a long period of time.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
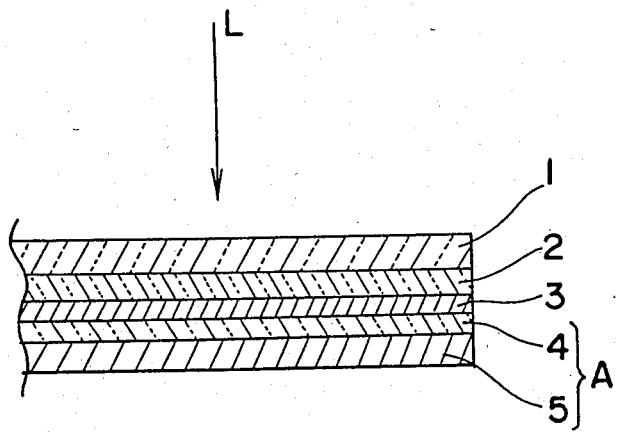
FIG. 1 is a sectional front view showing a portion of the magnetooptical storage element of this invention.

FIG. 1 shows a magnetooptical storage element of this invention, which comprises a transparent substrate 1 made of glass, polycarbonate, an acrylic resin, an epoxy resin, etc., a first transparent dielectric film 2 having a thickness ranging from 60 to 100 nm, preferably 80 nm, made of aluminum nitride (AlN) on the transparent substrate 1, a thin film (a recording medium) 3 having a thickness of, e.g., 20 nm of an amorphous alloy (containing rare-earth transition metals) made of a GdTbFe alloy on the first transparent dielectric film 2, a second transparent dielectric film 4 having a thickness ranging from 10 to 55 nm, preferably 25 nm, made of aluminum nitride (AlN) on the thin film 3, and a reflecting film 5 having a thickness of, e.g., 50 nm or more made of tantalum (Ta) on the second transparent dielectric film 4, resulting in a recording layer with a multi-layered structure. The reflecting film 5 can be made of titanium (Ti) instead of tantalum (Ta).

As mentioned above, when the reflecting film 5 is made of tantalum or titanium, the resulting magnetooptical storage element has the following advantages:

(1) The coefficient of thermal conductivity of tantalum and titanium is considerably smaller than that of the thermal conductivity of metals such as Al, Cu, Au, Ag, etc., so that when laser beams are irradiated onto the thin film (i.e., the recording medium) 3 from the transparent substrate 1 so as to achieve the recording of information, heat loss can be suppressed, causing a lowering of laser power required for the recording of information. According to this invention, the first and second transparent dielectric films 2 and 4 are made of aluminum nitride, which has a relatively high coefficient of thermal conductivity. Thus, it is most preferable for the reflecting film 5 to be made of tantalum or titanium, which has a low coefficient of thermal conductivity. Based on the inventors' experimental data that the recording sensitivity is indicated by length of the bit recorded at the time when laser beams having a predetermined amount of energy (i.e., a predetermined laser power) have been irradiated for a fixed period of time and that the recording sensitivity is higher as the length of the recorded bit becomes greater, the inventors conducted the following experiment: The recording sensitivity of the magnetooptical storage element shown in FIG. 1 in which the reflecting film 5 is made of tantalum or titanium was compared with that of a control standard magnetooptical storage element, which is the same as that shown in FIG. 1, except that the reflecting film 5 is made of Al. The experimental results indicated that the recording sensitivity of the element having the reflecting film 5 made of tantalum or titanium is as high as 110% or more that of the element having the reflecting film 5 made of Al.

(2) The melting points of tantalum and titanium are extremely high, so that tantalum and titanium are more heat-stable than Al, etc. Therefore, the application of tantalum or titanium to the reflecting film 5 of magnetooptical storage elements is significantly advantageous in that excellent reliability of the elements can be maintained over a long period of time.

(3) Titanium, with a low thermal conductivity coefficient, has a high reflective index so that it can be used as a reflecting film to create a large amount of reflected light toward the information-reproducing system, resulting in excellent reproduction characteristics of a magnetooptical storage element.

Although the reflecting film 5 was made of tantalum or titanium in the above-mentioned examples, metals or metalloids including lead (PB), zirconium (Zr), bismuth (Bi), tellurium (Te), selenium (Se), etc., and alloys including SUS, AlNi, etc., can be employed therefor, because the subject matter of this invention requires that the reflecting film is constituted by substances having a low thermal conductivity coefficient in order to improve element characteristics such as the recording sensitivity of magnetooptical storage elements provided with a recording layer of a multi-layered structure including the reflecting film.

Although the above-mentioned example disclosed the thin film 3 as a recording medium made of a GdTbFe alloy alone, the thin film can be made of other amorphous alloys containing rare-earth transition metals such as GdTbFeCo, TbFe, TbFeCo, etc. The first and second transparent dielectric films 2 and 4 can be made of materials such as SiN, ZnN, SiO, SiO$_2$, etc., other than aluminum nitride. Moreover, so long as the magnetooptical storage element is provided with the recording layer of a multi-layered structure including the reflecting film 5, it is not limited to the structure described in the above-mentioned example. Moreover, the thickness of each layer or film described in the above-mentioned is not limited thereto.

It is understood that various other modifications will be apparent to and can be readily made by those skilled in the art without departing from the scope and spirit of this invention. Accordingly, it is not intended that the scope of the claims appended hereto be limited to the description as set forth herein, but rather than the claims be construed as encompassing all the features of patentable novelty that reside in the present invention, including all features that would be treated as equivalents thereof by those skilled in the art to which this invention pertains.

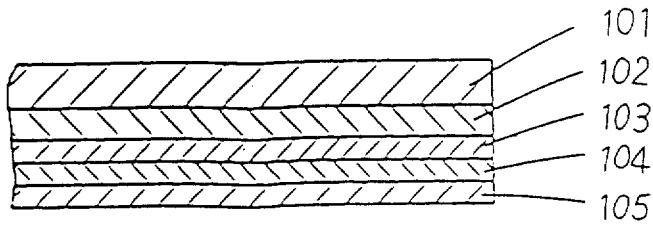

What is claimed is:

1. A magnetooptical storage element comprising a recording layer of a multi-layered structure, said structure including a transparent substrate, a first transparent dielectric film on said substrate, a thin film of an amorphous alloy containing rare-earth transition metals on said first transparent dielectric film, a second transparent dielectric film on said thin film, and a reflecting film on said second transparent dielectric film, said reflecting film being made of metals or metalloids is selected from the group consisting of tantalum, lead, zirconium, bismuth, tellurium, and selenium.

2. A magnetooptical storage element according to claim 1, wherein said transparent substrate is made of one selected from the group consisting of glass, polycarbonate, an acrylic resin, and an epoxy resin.

3. A magnetooptical storage element according to claim 1, wherein said first and/or second transparent dielectric films are made of one selected from the group consisting of AlN, SiN, ZnN, SiO, and SiO$_2$.

4. A magnetooptical storage element according to claim 1, wherein said thin film is made of an amorphous alloy of one selected from the group consisting of GdTbFe, GdTbFeCo, TbFe, and TbFeCo.

* * * * *

UNITED STATES PATENT AND TRADEMARK OFFICE
CERTIFICATE OF CORRECTION

PATENT NO. : 4,786,559

DATED : Nov. 22, 1988

INVENTOR(S) : Yoshiteru Murakami, et al.

Figure 2:
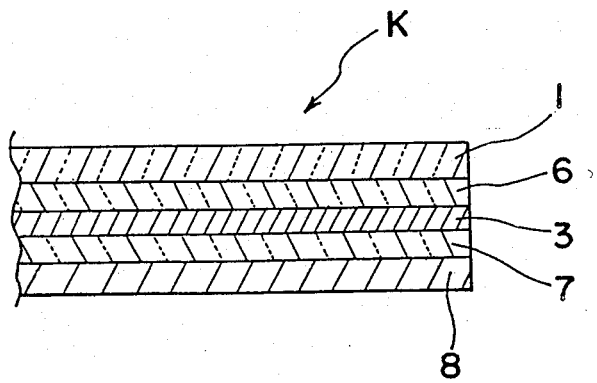
FIG. 2 is a sectional front view showing a portion of a conventional magnetooptical storage element.
Figure 1:
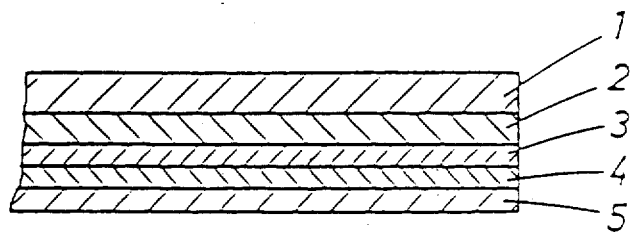
Figure 2:
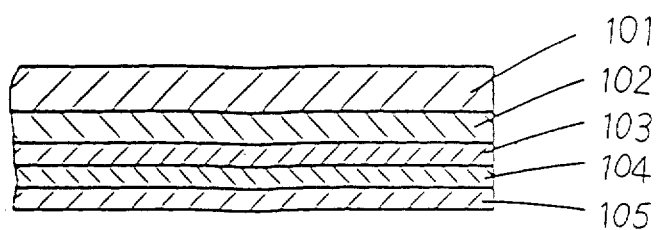

It is certified that error appears in the above-identified patent and that said Letters Patent is hereby corrected as shown below:

The title page, showing the illustrative figure, and the Drawing Sheet, consisting of FIGS. 1 and 2, should be deleted and substitute therefor the attached title page, showing the illustrative figure, and Drawing Sheet, consisting of FIGS. 1 and 2.

Signed and Sealed this

Nineteenth Day of May, 1992

Attest:

DOUGLAS B. COMER

*Attesting Officer*   Acting Commissioner of Patents and Trademarks

United States Patent

Murakami et al.

[11] Patent Number: 4,786,559
[45] Date of Patent: * Nov. 22, 1988

[54] MAGNETOOPTICAL STORAGE ELEMENT

[75] Inventors: Yoshiteru Murakami, Nishinomiya; Akira Takahashi, Nara; Hiroyuki Katayama, Ikoma; Tomoyuki Miyake, Tenri; Kenji Ohta, Nara; Michinobu Mieda, Tenri, all of Japan

[73] Assignee: Sharp Kabushiki Kaisha, Osaka, Japan

[ * ] Notice: The portion of the term of this patent subsequent to Jan. 5, 2005 has been disclaimed.

[21] Appl. No.: 945,354

[22] Filed: Dec. 22, 1986

[30] Foreign Application Priority Data

Dec. 25, 1985 [JP] Japan .................. 60-296076
Apr. 1, 1986 [JP] Japan .................. 61-76342

[51] Int. Cl.⁴ .............................. G11B 7/24
[52] U.S. Cl. ............... 428/472; 428/694; 428/698; 428/900
[58] Field of Search ........... 428/694, 972, 900, 698; 365/122; 360/131, 135; 369/13, 288, 375, 376

[56] References Cited

U.S. PATENT DOCUMENTS

| 4,230,939 | 10/1980 | de Bont et al. .............. 430/495 |
| 4,610,903 | 9/1986 | Nomura et al. .............. 428/694 |
| 4,717,628 | 1/1988 | Takahashi et al. ............ 428/694 |

FOREIGN PATENT DOCUMENTS

| 111988 | 6/1984 | European Pat. Off. . |
| 192256 | 8/1986 | European Pat. Off. . |
| 195532 | 9/1986 | European Pat. Off. . |
| 34133 | 2/1985 | Japan . |
| 92455 | 5/1986 | Japan . |
| 115252 | 7/1986 | Japan . |

Primary Examiner—George F. Lesmes
Assistant Examiner—William Atkinson
Attorney, Agent, or Firm—Ciotti & Murashige, Irell & Manella

[57] ABSTRACT

A magnetooptical storage element comprising a recording layer of a multi-layered structure including a reflecting film, said reflecting film being made of metals or metalloids having a low thermal conductivity coefficient.

4 Claims, 1 Drawing Sheet